United States Patent [19]

Meixner et al.

[11] Patent Number: 4,983,712

[45] Date of Patent: Jan. 8, 1991

[54] POLYESTERS CONTAINING ACRYLOYL GROUPS AND A PROCESS FOR THEIR PRODUCTION

[75] Inventors: Jügen Meixner, Krefeld; Wolfgang Fischer, Meerbusch, both of Fed. Rep. of Germany

[73] Assignee: Bayer Aktiengesellschaft, Bayerwerk, Fed. Rep. of Germany

[21] Appl. No.: 549,572

[22] Filed: Jul. 6, 1990

[30] Foreign Application Priority Data

Jul. 12, 1989 [DE] Fed. Rep. of Germany ....... 3922875

[51] Int. Cl.$^5$ ............................................ C08G 63/02
[52] U.S. Cl. ................................... 528/272; 528/300; 528/301; 528/303; 528/308; 528/308.6; 525/48; 525/437; 525/445; 525/449; 525/450; 525/451
[58] Field of Search ............... 528/272, 300, 301, 303, 528/308, 308.6; 525/437, 445, 449, 450, 451, 48

[56] References Cited

U.S. PATENT DOCUMENTS

| | | | |
|---|---|---|---|
| 3,952,032 | 4/1976 | Vrancken et al. | 260/404.8 |
| 4,001,097 | 1/1977 | Ogasawara et al. | 204/159.16 |
| 4,206,025 | 6/1980 | Vracken et al. | 204/159.16 |
| 4,275,176 | 6/1981 | Login | 525/48 |
| 4,317,894 | 3/1982 | Lewarchik et al. | 525/455 |
| 4,649,082 | 3/1987 | Friedlander | 428/461 |
| 4,778,842 | 10/1988 | Taniguchi et al. | 524/504 |
| 4,877,922 | 10/1989 | Saski et al. | 528/272 |

FOREIGN PATENT DOCUMENTS

0279303 8/1988 European Pat. Off. .

*Primary Examiner*—Morton Foelak
*Assistant Examiner*—Sam A. Acquah

*Attorney, Agent, or Firm*—Joseph C. Gil; Thomas W. Roy

[57] ABSTRACT

The present invention relates to polyesters which contain one or more acryloyl groups, have a viscosity at 23°C. of 2,000 to 20,000 mPa.s and an acid value of 0 to 25, and are based on the esterification product of (I) a dicarboxylic acid component containing
   (A) 20 to 70 mole percent of terephthalic acid,
   (B) 30 to 80 mole percent of adipic acid and
   (C) 0 to 30 mole percent of at least one aromatic, aliphatic or cycloaliphatic dicarboxylic acid, other than terephthalic or adipic acid, having a molecular weight of 100 to 202 or an anhydride of such dicarboxylic acid,
(II) at least 1.5 moles, based on one mole of the dicarboxylic acid component, of a polyol component containing
   (D) 0.4 to 1.5 moles of at least one dihydric, saturated $C_{2-6}$ alcohol and
   (E) 0.4. to 1.1 moles of at least one trihydric, saturated alcohol containing ether groups and obtained by the addition of 3 to 6 moles of ethylene oxide onto 1 mole of a trihydric, saturated alcohol containing ether groups and having a molecular weight of 92 to 134 and
(III) an unsaturated acid component containing, based on one mole of the dicarboxylic acid component,
   (F) 1.0 to 2.0 moles of acrylic acid, wherein the sum of the hydroxyl equivalents of components (D) and (E) is greater than or equal to the sum of the carboxyl equivalents of components (A), (B), (C) and (F).

The present invention also relates to a process for the preparation of these polyesters.

2 Claims, No Drawings

POLYESTERS CONTAINING ACRYLOYL GROUPS AND A PROCESS FOR THEIR PRODUCTION

BACKGROUND OF THE INVENTION

1. Field of the Invention

This invention relates to polyesters containing acryloyl groups which can be converted into crosslinked products by radiation curing and to a process for their production.

2. Description of the Prior Art

It is known that polyesters containing at least 2 acryloyl groups can be crosslinked by radiation curing (electron beam or UV curing). These polyester acrylates, which are obtained in the form of reaction products of acrylic acid with diols, polyols and dicarboxylic acids (as described for example in DE-OS Nos. 2 261 612 or 2 838 691), generally have a highly viscous, partly resinlike consistency. In order to process these compositions, large quantities of vinyl monomers, so-called reactive diluents, have to be added.

In most cases, however, the effect of using reactive diluents is that, in the formulations to be applied, the binder is very heavily diluted so that the paint properties produced by the polyester acrylates are offset by the reactive diluents incorporated into the film by polymerization. This effect is observed particularly clearly when the binder has a highly viscous consistency. In addition, many vinyl monomers have a strong natural odor and an irritating effect on the skin.

It is known (cf. for example DE-OS No. 3 704 098) that low viscosity polyester acrylates may be obtained by esterifying low molecular weight polyesters or polyethers are esterified. However, coating compositions based on these starting materials are attended in particular by the disadvantage of comparatively slow curing under irradiation.

Accordingly, an object of the present invention is to provide new polyester acrylates which, by virtue of their low viscosity, require very little solvent for attaining application viscosity and which, after radiation curing, possess the known favorable properties of polyester acrylates.

It has now surprisingly been found that this objective may be achieved using the polyester acrylates according to the invention which are described in detail hereinafter.

SUMMARY OF THE INVENTION

The present invention relates to polyesters which contain one or more acryloyl groups, have a viscosity at 23° C. of 2,000 to 20,000 mPa.s and an acid value of 0 to 25, and are based on the esterification product of (I) a dicarboxylic acid component containing
  (A) 20 to 70 mole percent of terephthalic acid,
  (B) 30 to 80 mole percent of adipic acid and
  (C) 0 to 30 mole percent of at least one aromatic, saturated aliphatic or saturated cycloaliphatic dicarboxylic acid, other than terephthalic or adipic acid, having a molecular weight of 100 to 202 or an anhydride of such dicarboxylic acid,
(II) at least 1.5 moles, based on one mole of the dicarboxylic acid component, of a polyol component containing
  (D) 0.4 to 1.5 moles of at least one dihydric, saturated $C_{2-6}$ alcohol and
  (E) 0.4 to 1.1 moles of at least one trihydric, saturated alcohol containing ether groups and obtained by the addition of 3 to 6 moles of ethylene oxide onto 1 mole of a trihydric, saturated alcohol containing ether groups and having a molecular weight of 92 to 134 and
(III) an unsaturated acid component containing, based on one mole of the dicarboxylic acid component,
  (F) 1.0 to 2.0 moles of acrylic acid,
wherein the sum of the hydroxyl equivalents of components (D) and (E) is greater than or equal to the sum of the carboxyl equivalents of components (A), (B), (C) and (F).

The present invention also relates to a process for the preparation of polyesters containing one or more acryloyl groups and having a viscosity at 23° C. of 2,000 to 20,000 mPa.s and an acid value of 0 to 25 by reacting (I) a dicarboxylic acid component containing
  (A) 20 to 70 mole percent of terephthalic acid,
  (B) 30 to 80 mole percent of adipic acid and,
  (C) 0 to 30 mole percent of at least one aromatic, saturated aliphatic or saturated cycloaliphatic dicarboxylic acid, other than terephthalic or adipic acid, having a molecular weight of 100 to 202 or an anhydride of such dicarboxylic acid with
(II) at least 1.5 moles, based on one mole of the dicarboxylic acid component, of a polyol component containing
  (D) 0.4 to 1.5 moles of at least one dihydric, saturated $C_{2-6}$ alcohol and
  (E) 0.4 to 1.1 moles of at least one trihydric, saturated alcohol containing ether groups and obtained by the addition of 3 to 6 moles of ethylene oxide onto 1 mole of a trihydric, saturated alcohol containing ether groups and having a molecular weight of 92 to 134,
at a temperature of 180° to 250° C. under melt condensation conditions until an acid number of less than 3 is attained and subsequently reacting the resulting product with (III) an unsaturated acid component containing, based on one mole of the dicarboxylic acid component,
  (F) 1.0 to 2.0 moles of acrylic acid,
wherein the sum of the hydroxyl equivalents of components (D) and (E) is greater than or equal to the sum of the carboxyl equivalents of components (A), (B), (C) and (F).

DETAILED DESCRIPTION OF THE INVENTION

Component (A) is terephthalic acid. Component (B) is adipic acid. Component (F) is acrylic acid.

Carboxylic acids which are suitable for use as component (C) include phthalic acid, hexahydrophthalic acid, isophthalic acid, phthalic anhydride, hexahydrophthalic anhydride and mixtures thereof.

Component (D) is a diol component based on at least one dihydric, saturated, $C_{2-6}$ alcohol. Suitable examples include ethylene glycol, propane-1,2-diol, propane-1,3-diol, butane-1,2-diol, butane-1,3-diol, butane-1,4-diol, pentane-1,3-diol, hexane-1,6-diol and diethylene glycol. Ethylene glycol and propane-1,2-diol are preferred.

Component (E) is a triol component based on at least one trihydric saturated alcohol containing ether groups which may be obtained in known manner, e.g., by the addition of 3 to 6 moles of ethylene oxide onto a saturated, trihydric alcohol free from ether groups and having a molecular weight of 92 to 134. The triols containing ether groups are preferably the ethoxylation products of glycerol, trimethylol ethane or trimethylol propane, wherein the degree of ethoxylation (degree of ethoxylation=average number of moles of ethylene oxide added onto 1 mole of triol) is 3 to 6. The adduct of 3 to 4 moles of ethylene oxide with 1 mole of trimethylol propane [1,1,1-tris-(hydroxymethyl)propane] is particularly preferred as component (E).

The process according to the invention is the preferred method for the production of the polyester acrylates. The process is based on a two-step reaction in which the starting components (A) to (E) are reacted with one another under melt condensation conditions in the first step until an acid value (mg KOH/g solids) below 3 is attained. In the second step the polyester containing hydroxyl groups is esterified with the acrylic acid. In the second step, the reactants are heated at the the boiling temperature of the mixture in the presence of 0.5 to 3.0 percent by weight, based on the weight of the reactants, of an esterification catalyst (for example sulfuric acid or p-toluene sulfonic acid) and in the presence of one or more polymerization inhibitors (such as hydroquinone monomethyl ether, p-methoxy phenol or 2,4-di-tert.-butyl hydroquinone). The reaction is conducted in atmospheric oxygen and in an inert solvent (such as cyclohexane, isooctane or toluene) until no more water of reaction is eliminated. The water of reaction is removed simultaneously by azeotropic distillation. In general, the second step of the reaction is carried out at a temperature of about 70° to 130° C., preferably about 100° to 120° C. After the reaction, the solvent used is removed by distillation, preferably under vacuum. The resulting product may optionally be subjected to an additional treatment to obtain a lower acid value, such as a reaction with carbodiimides according to DE-OS 3 514 402 or with epoxides according to DE-OS No. 3 316 593.

When the polyester acrylates according to the invention are used as paint binders, they may be used without the addition of copolymerizable monomers (reactive diluents) and without the addition of solvents, because the products according to the invention have a comparatively low viscosity.

However, copolymerizable monomers may be added. Suitable copolymerizable monomers suitable for mixing with the polyester acrylates according to the invention include $C_{1-4}$ alkyl esters of acrylic or methacrylic acid and styrene, which may be used as reactive diluents in quantities of 0 to about 70% by weight, based on the total weight of the polyester according to the invention and the reactive diluent.

The reaction products according to the invention may optionally be mixed with inert solvents such as butyl acetate, cyclohexane, acetone and toluene. The inert solvents may be added in quantities of 0 to about 70% by weight, based on the mixture of polyester acrylates according to the invention and additional solvents. Mixtures of additional monomers and solvents may be used in the quantitative ratios indicated.

The paints produced using the products according to the invention may contain the auxiliaries and additives which are known from paint technology such as fillers, pigments, dyes, thixotropic agents, levelling agents, flatting agents and flow control agents.

The paints are eminently suitable for application on conventional paint lines equipped with coating machines. They may also be applied by roll coating or spraying. Preferred substrates include wood and wood composites, paper, cork and plastics.

The paints are cured by ionizing radiation, for example, by high energy electron beams, or by UV irradiation in the presence of photoinitiators. Suitable photoinitiators which are incorporated in the paints when necessary before their application include any of the known compounds for radiation curing such as benzophenone and aromatic keto compounds. Preferred photoinitiators include benzoin and its derivatives as described for example in DE-OS Nos. 1 769 168, 1 769 853, 1 769 854, 1 807 297, 1 807 301, 1 919 678 and in DE-AS No. 1 694 143; benzil ketals such as benzil dimethyl ketals; and hydroxy alkyl phenones such as 2-hydroxy-2-methyl-1-phenylpropan-1-one.

In the following examples and comparison examples, all parts and percentages are by weight unless otherwise indicated.

In Examples 1 to 3 according to the invention and Comparison Examples 4 to 8, which are summarized in Tables 1 and 2, starting components (A), (B), (C), (D) and (E) were initially heated under nitrogen in first reaction step at 200° to 250° C. in the absence of other additives until an acid value below 3 was attained.

The second step of the process according to the invention was carried out in a 70% solution in toluene in the presence of 1.5% p-toluene sulfonic acid as catalyst and 0.1% p-methoxy phenol and 0.1% 3,4-di-tert.-butyl hydroquinone as inhibitors, the percentages being based on the total weight of components (A) to (F). After the addition of component (F), the catalyst, inhibitors and toluene, the mixture was heated at 100° to 120° C., while air was passed through and the water formed was continuously removed by azeotropic distillation until no more water was eliminated. After cooling, the solvent was distilled off under vacuum at 50° to 90° C.

In order to demonstrate the effect of correctly choosing the type and quantity of starting materials, Example 2 was repeated with the following changes:

Comparison Example 4 contained phthalic acid instead of terephthalic acid;

Comparison Example 5 contained phthalic acid instead of adipic acid;

Comparison Example 6 contained propoxylated trimethylol propane instead of ethoxylated trimethylol propane;

Comparison Example 7 contained less than the required amount of terephthalic acid; and Comparison Example 8 contained more than the required amount of terephthalic acid.

The starting materials are listed in Table 1, while the properties of the resulting polyesters are set forth in Table 2.

TABLE 1

| Starting Materials (quantities in moles) | | Examples according to the invention | | | Comparison Examples | | | |
|---|---|---|---|---|---|---|---|---|
| | | 1 | 2 | 3 | 4 | 5 | 6 | 7 | 8 |
| (A) | Terephthalic acid | 0.2 | 0.4 | 0.6 | | 0.4 | 0.4 | 0.1 | 0.8 |
| (B) | Adipic acid | 0.8 | 0.6 | 0.4 | 0.6 | | 0.6 | 0.9 | 0.2 |
| (C) | Phthalic anhydride | | | | 0.4 | 0.6 | | | |
| (D) | Ethylene glycol | 1.2 | 1.2 | 1.2 | 1.2 | 1.2 | 1.2 | 1.2 | 1.2 |
| (E) | Ethoxylated trimethylol propane (degree of ethox.: 4) | 0.5 | 0.5 | 0.5 | 0.5 | 0.5 | | 0.5 | 0.5 |
| | Propoxylated trimethylol propane (degree of propox.: 3) | | | | | | | | |
| (F) | Acrylic acid | 1.4 | 1.4 | 1.4 | 1.4 | 1.4 | 1.4 | 1.4 | 1.4 |

Use Examples 1 to 3 (According to the Invention) and Comparison Examples 4 to 8

Comparison Examples 5 and 8 had excessive viscosities and, therefore, were not used.

5% of 1-phenyl-2-hydroxy-2-methylpropan-1-one was added to the products of the remaining examples. After application of the paint films to veneered chipboard (in a thickness of 12 μm), the boards were moved past a Hanovia lamp (80 W/cm) arranged overhead at a distance of 10 cm.

The reactivity value set forth in Table 2 indicates the speed of the conveyor belt at which a scratch-resistant coating was obtained.

TABLE 2

| | Examples according to the invention | | | Comparison Examples | | | | |
|---|---|---|---|---|---|---|---|---|
| | 1 | 2 | 3 | 4 | 5 | 6 | 7 | 8 |
| Properties of the polyester: | | | | | | | | |
| Acid no. (mg KOH/g) | 22 | 10 | 15 | 14 | 20 | 15 | 14 | 15 |
| Viscosity (mPa.s at 23° C.) | 3700 | 6000 | 9500 | 3800 | 45000 | 5200 | 2100 | 28100 |
| Reactivity (m/min.) | 60 | 60 | 60 | 30 | — | 20 | 40 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester which contains one or more acryloyl groups, has a viscosity at 23° C. of 2,000 to 20,000 mPa.s and an acid value of 0 to 25, and is based on the esterification product of
(I) a dicarboxylic acid component comprising
  (A) 20 to 70 mole percent of terephthalic acid,
  (B) 30 to 80 mole percent of adipic acid and,
  (C) 0 to 30 mole percent of at least one aromatic, saturated aliphatic or saturated cycloaliphatic dicarboxylic acid, other than terephthalic or adipic acid, having a molecular weight of 100 to 202 or an anhydride of such dicarboxylic acid,
(II) at least 1.5 moles, based on one mole of said dicarboxylic acid component, of a polyol component comprising
  (D) 0.4 to 1.5 moles of at least one dihydric, saturated $C_{2-6}$ alcohol and
  (E) 0.4 to 1.1 moles of at least one trihydric, saturated alcohol containing ether groups and obtained by the addition of 3 to 6 moles of ethylene oxide onto 1 mole of a trihydric, saturated alcohol containing ether groups and having a molecular weight of 92 to 134 and
(III) an unsaturated acid component comprising, based on one mole of said dicarboxylic acid component,
  (F) 1.0 to 2.0 moles of acrylic acid,
wherein the sum of the hydroxyl equivalents of components (D) and (E) is greater than or equal to the sum of the carboxyl equivalents of components (A), (B), (C) and (F).

2. A process for the preparation of a polyester containing one or more acryloyl groups and having a viscosity at 23° C. of 2,000 to 20,000 mPa.s and an acid value of 0 to 25 which comprises reacting
(I) a dicarboxylic acid component comprising
  (A) 20 to 70 mole percent of terephthalic acid,
  (B) 30 to 80 mole percent of adipic acid and,
  (C) 0 to 30 mole percent of at least one other aromatic, saturated aliphatic or saturated cycloaliphatic dicarboxylic acid, other than terephthalic or adipic acid, having a molecular weight of 100 to 202 or an anhydride of such dicarboxylic acid with
(II) at least 1.5 moles, based on one mole of said dicarboxylic acid component, of a polyol component comprising
  (D) 0.4 to 1.5 moles of at least one dihydric, saturated $C_{2-6}$ alcohol and
  (E) 0.4 to 1.1 moles of at least one trihydric, saturated alcohol containing ether groups and obtained by the addition of 3 to 6 moles of ethylene oxide onto 1 mole of a trihydric, saturated alcohol containing ether groups and having a molecular weight of 92 to 134
at a temperature of 180° to 250° C. under melt condensation conditions until an acid number of less than 3 is attained and subsequently reacting the resulting product with (III) an unsaturated acid component comprising, based on one mole of said dicarboxylic acid component,
  (F) 1.0 to 2.0 moles of acrylic acid,
wherein the sum of the hydroxyl equivalents of components (D) and (E) is greater than or equal to the sum of the carboxyl equivalents of components (A), (B), (C) and (F).

* * * * *